(12) United States Patent
Wu et al.

(10) Patent No.: US 12,513,746 B2
(45) Date of Patent: Dec. 30, 2025

(54) TECHNIQUES FOR CROSS CHANNEL OCCUPANCY TIME HYBRID AUTOMATIC REPEAT REQUEST FEEDBACK TRANSMISSION FOR SIDELINK COMMUNICATION IN UNLICENSED SPECTRUM

(71) Applicant: QUALCOMM Incorporated, San Diego, CA (US)

(72) Inventors: Shuanshuan Wu, San Diego, CA (US); Xiaoxia Zhang, San Diego, CA (US); Stelios Stefanatos, San Diego, CA (US); Parisa Cheraghi, Cambridge (GB); Arthur Gubeskys, San Diego, CA (US); Tao Luo, San Diego, CA (US); Jing Sun, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 356 days.

(21) Appl. No.: 18/031,562

(22) PCT Filed: Dec. 2, 2021

(86) PCT No.: PCT/US2021/072710
§ 371 (c)(1),
(2) Date: Apr. 12, 2023

(87) PCT Pub. No.: WO2022/126075
PCT Pub. Date: Jun. 16, 2022

(65) Prior Publication Data
US 2023/0389076 A1    Nov. 30, 2023

(30) Foreign Application Priority Data

Dec. 8, 2020   (GR) .............................. 20200100717

(51) Int. Cl.
*H04W 74/08*     (2024.01)
*H04W 74/0816*   (2024.01)

(52) U.S. Cl.
CPC ... *H04W 74/0816* (2013.01); *H04W 74/0866* (2013.01)

(58) Field of Classification Search
CPC ......... H04W 74/0816; H04W 74/0866; H04W 74/0808; H04L 5/0055; H04L 1/1854
See application file for complete search history.

(56) References Cited

U.S. PATENT DOCUMENTS

2017/0048718 A1 * 2/2017 Kim .................. H04W 56/0005
2019/0230706 A1 * 7/2019 Li ....................... H04W 72/046
(Continued)

FOREIGN PATENT DOCUMENTS

CN    109863708 A        6/2019
EP    4260500 B1 *       7/2025 ........ H04W 74/0866
(Continued)

OTHER PUBLICATIONS

International Search Report and Written Opinion—PCT/US2021/072710—ISA/EPO—Mar. 11, 2022.
(Continued)

*Primary Examiner* — Wutchung Chu
(74) *Attorney, Agent, or Firm* — ArentFox Schiff, LLP

(57) ABSTRACT

Techniques for cross channel occupancy time (COT) hybrid automatic repeat request (HARQ) feedback transmission for sidelink communication in unlicensed spectrum may be performed. In an example, a receiving user equipment (UE) may receive, from a transmitting UE, a first transmission in a first channel occupancy time (COT). The receiving UE may also determine a first feedback occasion is after a last slot of the first COT. The receiving UE may also determine one or more feedback configurations. The receiving UE may (Continued)

also transmit, to the transmitting UE, a feedback message indicating decoding of the first transmission in the first feedback occasion or a second feedback occasion based on the one or more feedback configurations.

28 Claims, 11 Drawing Sheets

(56) References Cited

U.S. PATENT DOCUMENTS

| | | | |
|---|---|---|---|
| 2020/0100276 A1* | 3/2020 | Oh | H04W 16/14 |
| 2020/0221498 A1 | 7/2020 | Xue et al. | |
| 2020/0280971 A1* | 9/2020 | Moon | H04W 74/0808 |
| 2020/0351941 A1* | 11/2020 | Aldana | H04W 74/006 |
| 2020/0374933 A1* | 11/2020 | Lou | H04W 74/006 |
| 2021/0328728 A1* | 10/2021 | El Hamss | H04L 1/1864 |
| 2021/0344451 A1* | 11/2021 | Hedayat | H04L 1/1896 |
| 2021/0344453 A1* | 11/2021 | Lei | H04W 72/23 |
| 2021/0360666 A1* | 11/2021 | Yoshimura | H04L 1/1896 |
| 2022/0007399 A1* | 1/2022 | Rastegardoost | H04L 1/1861 |
| 2022/0287093 A1* | 9/2022 | Iyer | H04W 74/0808 |
| 2022/0304042 A1* | 9/2022 | Yang | H04L 5/0091 |
| 2022/0312459 A1* | 9/2022 | Yang | H04W 72/21 |
| 2023/0074018 A1* | 3/2023 | Nunome | H04L 5/0055 |
| 2023/0422299 A1* | 12/2023 | Kiilerich Pratas | H04W 74/0808 |

FOREIGN PATENT DOCUMENTS

| | | | |
|---|---|---|---|
| WO | 2020133184 A1 | 7/2020 | |
| WO | WO-2023201624 A1 * | 10/2023 | H04W 74/002 |

OTHER PUBLICATIONS

Lenovo, et al., "HARQ Enhancement for Nr-U", 3GPP Draft, 3GPP TSG RAN WG1 #96, R1-1902152, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), 5 Pages, XP051599847, Section 2.1, "HARQ-ACK Triggering", pp. 1-4.

Mediatek Inc: "Enhancements on HARQ for NR-U Operation", 3GPP TSG RAN WG1 Meeting #94bis, R1-1810444, 3rd Generation Partnership Project, Mobile Competence Centre, France, Chengdu, China, Oct. 8-12, 2018, Sep. 29, 2018, 6 Pages, XP051517853, Section 2.1, "Multiple/supplemental Transmission Opportunities for HARQ Feedback", pp. 2-3, figures 1-2, Section 2.3, "HARQ Feedback Outside of the same Channel Occupancy", pp. 4-5 Section 2.4 "Dynamic and Semi-Static HARQ-ACK Codebook Determinations", p. 5.

VIVO: "Discussion on HARQ Operation for NR-U," 3GPP Draft, 3GPP TSG RAN WG1 Ad-Hoc Meeting 1901, R1-1900112—Discussion on HARQ Operation for NR-U, 3rd Generation Partnership Project (3GPP), Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 12, 2019 (Jan. 12, 2019), XP051575737, 6 pages, pp. 2-4, Section 2.1 "HARQ-ACK feedback mechanism", pp. 1-4, figures 1-4.

* cited by examiner

US 12,513,746 B2

TECHNIQUES FOR CROSS CHANNEL OCCUPANCY TIME HYBRID AUTOMATIC REPEAT REQUEST FEEDBACK TRANSMISSION FOR SIDELINK COMMUNICATION IN UNLICENSED SPECTRUM

CROSS REFERENCE TO RELATED APPLICATIONS

The present application is a 35 U.S.C. § 371 National Phase of International Patent Application No. PCT/US2021/072710, entitled "TECHNIQUES FOR CROSS CHANNEL OCCUPANCY TIME HYBRID AUTOMATIC REPEAT REQUEST FEEDBACK TRANSMISSION FOR SIDELINK COMMUNICATION IN UNLICENSED SPECTRUM" and filed on Dec. 2, 2021, which claims priority to Greek Patent Application No. 20200100717, entitled "TECHNIQUES FOR CROSS CHANNEL OCCUPANCY TIME HYBRID AUTOMATIC REPEAT REQUEST FEEDBACK TRANSMISSION FOR SIDELINK COMMUNICATION IN UNLICENSED SPECTRUM" and filed on Dec. 8, 2020, the contents of which are hereby incorporated by reference in their entireties.

BACKGROUND

Aspects of the present disclosure relate generally to wireless communications, and more particularly, to apparatuses and methods for cross channel occupancy time (COT) hybrid automatic repeat request (HARQ) feedback transmission for sidelink communication in unlicensed spectrum.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a receiving user equipment (UE) is provided. The method may include receiving, from a transmitting UE, a first transmission in a first channel occupancy time (COT). The method may include determining, in response to the receiving of the first transmission, a first feedback occasion is outside of the first COT. The method may include determining, in response to determining the first feedback occasion is outside of the first COT, one or more feedback configurations. The method may include transmitting, to the transmitting UE, a feedback message indicating decoding of the first transmission in the first feedback occasion or a second feedback occasion based on the one or more feedback configurations.

In another aspect, a method of wireless communication by a transmitting UE. The method may include transmitting, to a receiving UE, a first transmission in a first COT. The method may include receiving, from the receiving UE, a feedback message indicating decoding of the first transmission in a feedback occasion after a last slot of the first COT based on one or more feedback configurations.

In other aspects, apparatus and computer-readable medium for performing these methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
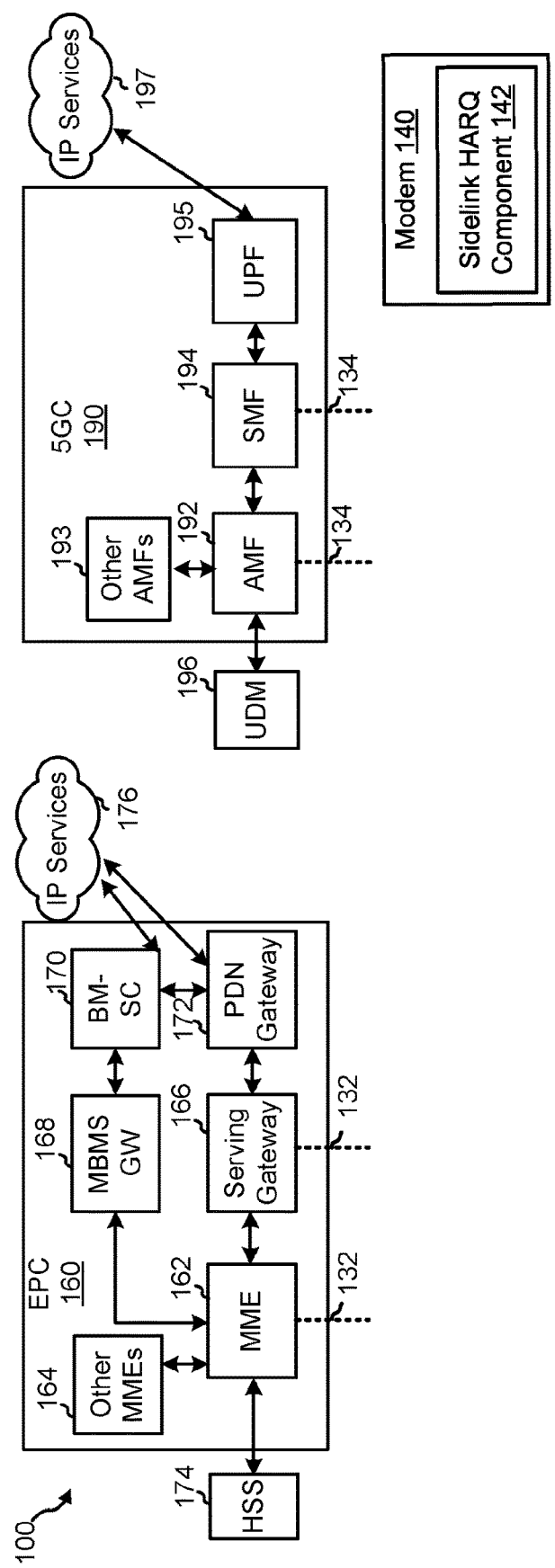
FIG. 1 is a diagram illustrating an example of a wireless communications system and an access network, according to aspects of the present disclosure.
Figure 1:
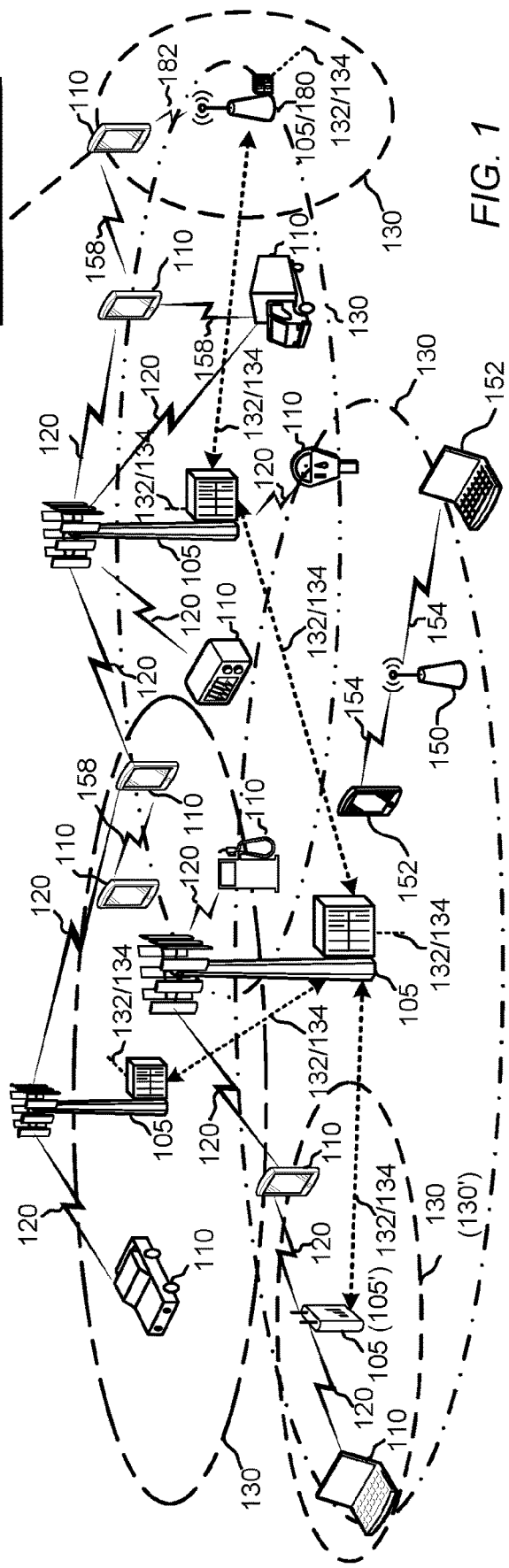

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventionally, new radio (NR) sidelink communications (e.g., NR vehicle-to-everything (V2X) communications) are designed to use licensed spectrums such as shared cellular bands or dedicated spectrum for intelligent transportation system (ITS) for communications. However, licensed spectrums may not be guaranteed in some regions. In these situations, NR V2X may use unlicensed spectrum shared by other technologies (e.g., Wi-Fi) to obtain additional bandwidth not provided by the licensed spectrum. However, unlicensed spectrums may be subject to regulatory requirements. One of the requirements includes listen-before-talk (LBT) techniques requiring a device to perform sensing (e.g., listen) before the device can transmit (e.g., talk). In LBT, a device may measure energy in a band and transmit if the energy is below a threshold. LBT includes different types of regulations including, for example, category (CAT) 2 LBT which does not include random back-off and CAT 4 LBT, which includes random back-off with a contention window of variable size. However, use of LBT may create uncertainty and add time delays for acknowledging data transmissions.

The present disclosure provides for cross channel occupancy time ((COT), or referred to as channel occupancy, (CO)) hybrid automatic repeat request (HARQ) feedback transmission for sidelink communication in unlicensed spectrum, which may improve success probability of HARQ feedback transmissions.

In more detail, NR V2X sidelink HARQ feedback mechanisms in licensed spectrums may include, for example, a first user equipment (UE1) that transmits a data channel, a second UE (UE2) that receives the transmission and sends an acknowledgment/negative acknowledgment (ACK/NACK) to indicate whether the data is successfully decoded. HARQ feedback transmissions may occur in a configured or pre-configured physical sidelink feedback channel (PSFCH) resource, which occurs in every N slots, where the feedback periodicity N=1, 2, or 4. For example N=1 means feedback opportunity in every slot (e.g., every slot has a resource configured for HARQ feedback transmission), N=2 means feedback opportunity in every other slot, and N=4 means feedback opportunity in every 4 slots.

The resource used for HARQ feedback transmission corresponding to a physical sidelink shared channel (PSSCH) is determined based on a time and a frequency location of the transmission and a transmitter UE identification (ID), and a receiver UE ID if the HARQ feedback is for ACK/NACK based groupcast communications.

In the current NR V2X, each HARQ feedback may be transmitted in one physical resource block (PRB) in a HARQ feedback occasion. In an example, there may be multiple PSFCH resources configured corresponding to a PSSCH transmission. In an example, multiple resources may be used for groupcast ACK/NACK feedback, so different receiving UEs in the group may transmit feedback in different PSFCH resources. In another example, it may be possible that multiple transmitting UEs transmit data in a same resource (e.g., data collision) and/or multiple HARQ resource mappings may alleviate HARQ collisions.

In an aspect, NR V2X for licensed spectrums may support autonomous resource allocation (e.g., Mode 2). In this example, a UE can access the channel based on V2X channel sensing by the UE. Specifically, the UE may first identify available resources for sidelink transmission (e.g., candidate resources) by the UE. The UE may then select resources for transmissions from the candidate resources. Resource selection and reservation in autonomous resource allocation may include reservations of up to two future resources, in addition to a current resource, for the UE's transmission (e.g., for retransmission of a packet) when transmitting the current transmission. For resource reservation, the UE may select resources from candidate resources. When transmitting a PSSCH, the UE's sidelink control indicator (SCI) transmission may indicate resource allocation for the current transmission. The SCI also may indicate one or more future resources, which may be used by the UE to perform retransmission(s) or to transmit different data packets. In some examples, the resource reservations can be chained.

In an aspect, NR-unlicensed (NR-U) may specify a Type 1 or a Type 2 channel access type. In the Type 1 channel access, time duration spanned by the sensing slots that are sensed to be idle before a transmission(s) may be random (e.g., CAT 4 LBT). In an example, the channel access by Type 1 channel access may include channel sensing or energy detection performed in a random number of sensing slots. In the Type 2 channel access, time duration spanned by sensing slots that are sensed to be idle before a transmission(s) is determined based on a Type 2A having a sensing duration of 25 microseconds (μs), a Type 2B having a sensing duration of 16 μs, or a Type 2C having no sensing duration (e.g., may be applied when a gap between two transmissions is no larger than 16 us). Typically, Type 2 channel access requires less operations than a Type 1 channel access.

In another aspect of NR-U, a base station may initiate a channel occupancy time (COT) or channel occupancy (CO) based on a Type 1 channel access. The base station may share the COT with other UEs, such that the UE may perform Type 2 channel access before intended transmissions in the COT, and the UE may transmit if the Type 2 channel access is successful.

In an aspect, HARQ feedback-based retransmissions may improve system performance. For example, retransmission(s) based on NACK feedback may guarantee that a packet is successfully delivered to intended receivers. Compared to blind retransmission (e.g., the packet is blindly transmitted multiple times without HARQ feedback mechanism), HARQ feedback-based retransmission may improve spectral efficiency. However, for sidelink communications in the unlicensed spectrum, HARQ feedback transmission may be subject to availability of the channel because the unlicensed spectrum is shared with other radio access technologies. Due to the uncertain channel availability in the unlicensed spectrum, HARQ feedback transmissions taking place in certain or known slots (such as in the pre-configured HARQ feedback occasions depending on a configuration of the feedback periodicity N and HARQ feedback processing timeline), may not be guaranteed. For example, a sidelink receiving UE receiving a sidelink data channel transmission in slot n may not be able to transmit HARQ feedback until slot n+k, where k is a HARQ feedback processing timeline which may be greater than or equal to 1 slot; however, the availability of slot n+k for HARQ feedback may be subject to e.g., LBT. Further, a COT shared by UEs for sidelink communications may have a limitation (e.g., 10 milliseconds (ms)/20 slots).

Figure 4:
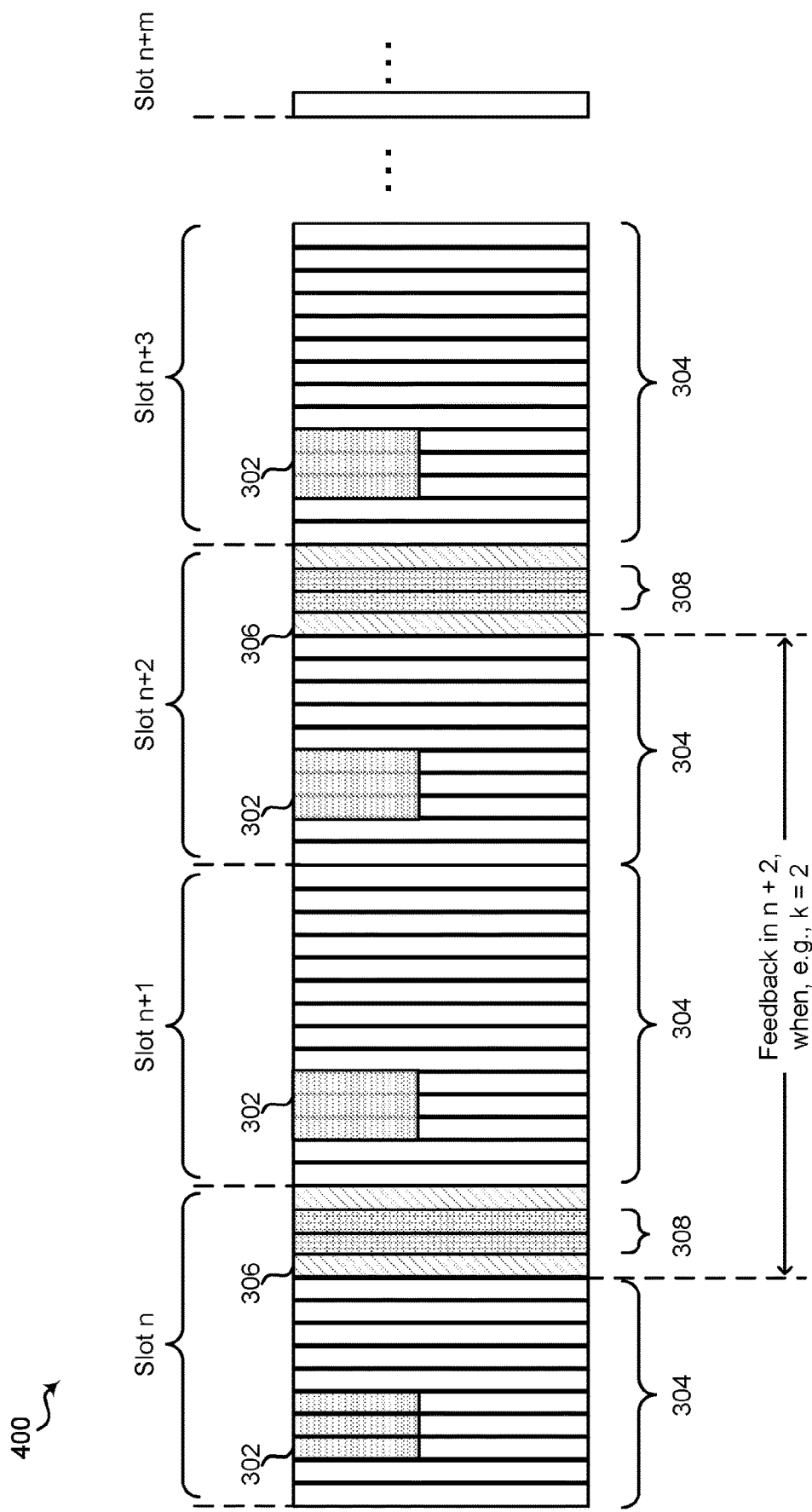
FIG. 4 is a block diagram of an example of a series of slot formats, according to aspects of the present disclosure.

Due to HARQ timeline limitations and COT duration limitations, sidelink data channel transmissions in the last one or multiple slots of a COT may not have a same-COT HARQ feedback resource available (e.g., see COT duration of FIG. 4). For example, for PSSCH transmissions taking place in the last few slots of the COT, there may not be HARQ feedback resources available for corresponding HARQ feedback transmissions in the same COT, due to the HARQ processing timeline (e.g., gap between PSSCH and PSFCH transmissions).

Accordingly, this present disclosure proposes HARQ feedback techniques that may improve the availability of the medium for HARQ feedback transmission, while, at the same time, without requiring the reduction of the receiving UE HARQ feedback processing time.

For a UE receiving a sidelink data channel transmission, the receiving UE may determine a first slot (or first PSFCH occasion) to transmit a HARQ feedback to acknowledge data channel, based on a PSFCH resource configuration and a HARQ timeline. If the receiving UE determines that the first PSFCH occasion is within the same active COT that the sidelink data channel has been received, the receiving UE may perform a HARQ feedback transmission following a regular HARQ feedback transmission procedure (e.g., perform Type 2 channel access for the HARQ feedback transmission).

However, if the receiving UE determines that the first PSFCH occasion is out of the first COT, for example, in a slot of the first COT but the first COT is no longer active in that slot (e.g., the first COT has been released at or prior to the slot) or a slot that is after the last slot of the first COT due to COT duration limitation, the UE may transmit the HARQ feedback based on four options. In Option 1, the receiving UE may determine that the first PSFCH occasion is in a slot of another active COT, which is initiated by either the receiving UE, the UE transmitting the PSSCH, or another UE. In Option 1, the receiving UE may transmit a HARQ feedback in the determined HARQ occasion (e.g., following a successful Type 2 channel access). In Option 2, the receiving UE may determine that there is a second COT that is active and adjacent to the first COT. In Option 2, the receiving UE may determine a second PSFCH occasion in the second COT to transmit the HARQ feedback (e.g., the second PSFCH occasion may be the same as or different from the first PSFCH occasion). In Option 3, the receiving UE may perform a Type 1 channel access prior to the first PSFCH occasion, and transmit a HARQ feedback in the first PSFCH occasion if the receiving UE succeeds the Type 1 channel access (i.e., the Type 1 channel access indicates an idle channel for the transmission). In Option 4, the receiving UE may determine that a total number of transmissions of PSFCH during a time window is smaller than a threshold value, and/or, a total duration of the transmissions of PSFCH during the time window is smaller than a threshold value, and the receiving UE may transmit the HARQ feedback in the first PSFCH occasion.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, UEs 110, an Evolved Packet Core (EPC) 160, and a 5G Core (5GC) 190. The base station 105 may include macro cells (high power cellular base station) and/or small cells (low power cellular base station). The macro cells include base stations. The small cells include femtocells, picocells, and microcells.

In some implementations, UEs 110 may include a modem 140 and/or a sidelink HARQ component 142 for channel access for sidelink HARQ feedback transmissions in an unlicensed spectrum.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the HE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
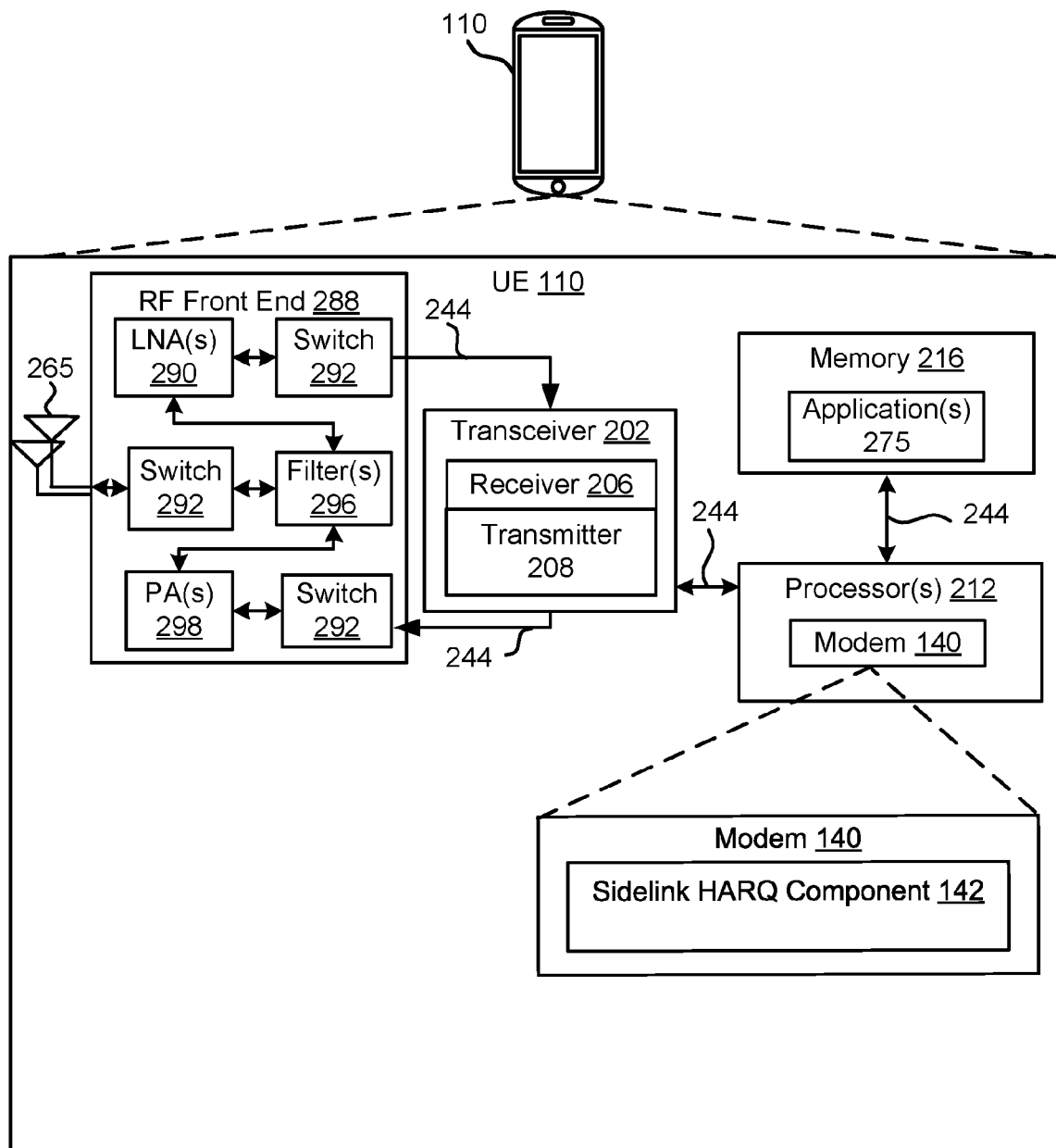
FIG. 2 is a schematic diagram of an example of a user equipment (UE) of FIG. 1, according to aspects of the present disclosure.

Referring to FIG. 2, an example implementation of the UE 110 may include the modem 140 having the sidelink HARQ component 142. The modem 140 and/or the sidelink HARQ component 142 of the UE 110 may be configured to manage communications with other UEs via a cellular network, a Wi-Fi network, or other wireless and wired networks using licensed and/or unlicensed spectrums.

In some implementations, the UE 110 may include a variety of components, including components such as one or more processors 212 and memory 216 and transceiver 202 in communication via one or more buses 244, which may operate in conjunction with the modem 140 and/or the sidelink HARQ component 142 to enable one or more of the functions described herein related to sidelink HARQ transmissions. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the sidelink HARQ component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the sidelink HARQ component 142 may be performed by the transceiver 202.

Also, the memory 216 may be configured to store data used herein and/or local versions of applications 275 or the sidelink HARQ component 142 and/or one or more subcomponents of the sidelink HARQ component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the sidelink HARQ component 142 and/or one or more of its subcomponents, and/or data associated therewith, when the UE 110 is operating at least one processor 212 to execute the sidelink HARQ component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the base stations 105 or one or more cells associated with one or more of the base stations 105. In an aspect, for example, the modem 140 may configure the transceiver 202 to operate at a specified frequency and power level based on a UE configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on UE configuration information associated with the UE 110 as provided by the network (e.g., base station 105).

Figure 3:
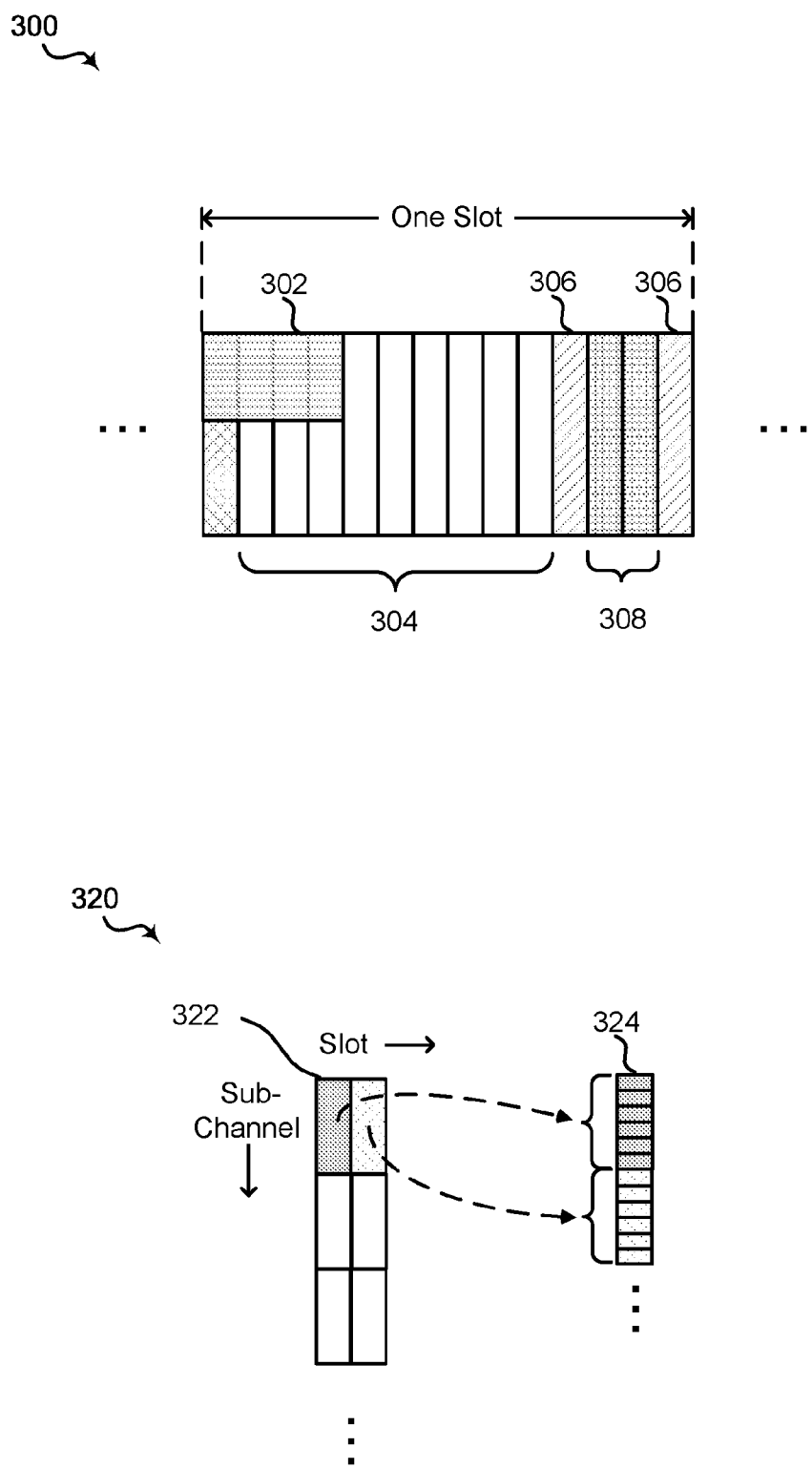
FIG. 3 is block diagrams of examples of slot formats, according to aspects of the present disclosure.

Referring to FIG. 3, a single slot format 300 for an NR V2X communication is provided. In an example, the slot format 300 may include 14 symbols including a portion for a physical sidelink control channel (PSCCH) 302 used, for example, for carrying control signals, a portion for the PSSCH 304 used, for example, for carrying data signals, one or more gaps 306, and the PSFCH 308 used, for example, for carrying feedback signals (e.g., HARQ ACK/NACK). Each slot 322 of a plurality of slots 320 may be divided into frequency PRB 324 or sub-channel; PSFCH resources in a PSFCH slot may consist of a set of PRBs 324. In NR V2X, one PSFCH may be transmitted using one PRB 324, with a certain code domain resource (cyclic shift (CS)).

Referring to FIG. 4, an example of a series of slots 400 for NR V2X communications is provided. As illustrated, the series of slots 400 may initiate with slot n, and increase until n+m slots, where m is any whole number. As described herein, feedback may be based on the feedback periodicity N, and the processing time of a receiving UE 110 to decode a received transmission. As shown by the series of slots 400, if N=2 (i.e., feedback opportunities are in every other slot) and k=2 (i.e., two slots are needed for the processing time of the receiving UE 110 to decode the transmission and process the HARQ feedback), a feedback occasion may not occur until every other slot.

Figure 5:
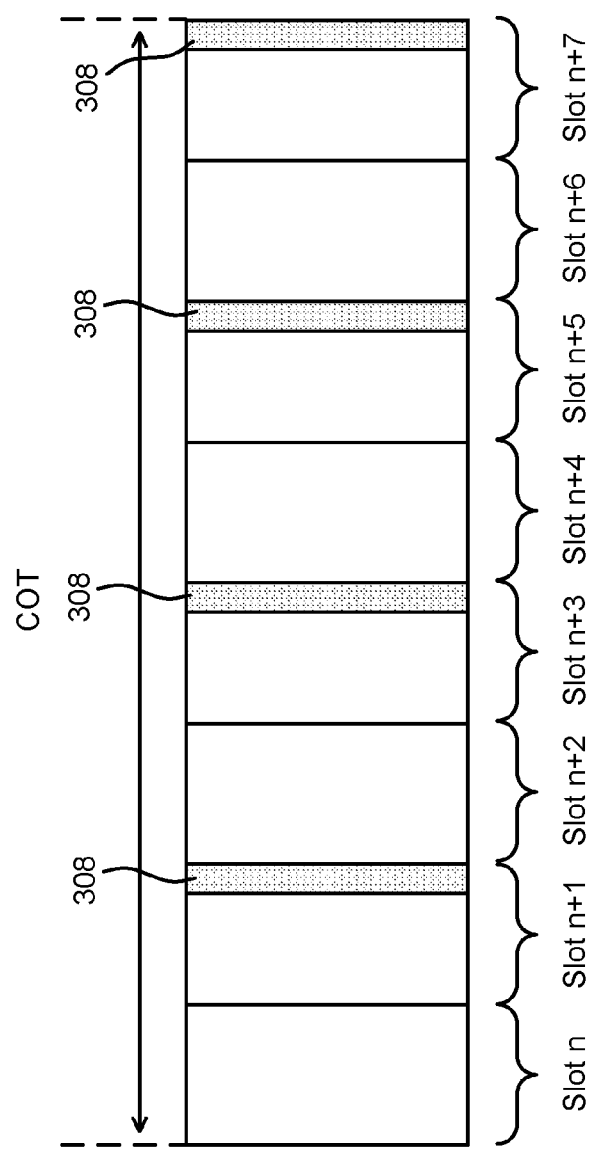
FIG. 5 is a block diagram of a channel occupancy time (COT) format, according to aspects of the present disclosure.

Referring to FIG. 5, an example COT 500 including a duration of 8 slots (e.g., Slot n-Slot n+7) is depicted. However, in other examples the COT may have a duration less than or greater than 8 slots.

As described herein, the feedback periodicity N may be set to different periodicities including, for example, the N=2 such that the PFSCH occasion 308 (or HARQ occasion) is every other slot, as illustrated by FIG. 5. As described herein, due to HARQ timeline limitations and COT duration limitations, sidelink data channel transmissions in a last single slot or multiple last slots of a COT may not have a same-COT HARQ feedback resource available. For example, if N=2 and k=2 (i.e., at least two slots are needed for the receiving UE 110 to decode a transmission and process HARQ feedback), as illustrated by FIG. 5, when a PSSCH is transmitted in slot n, the first HARQ occasion satisfying the timeline is slot n+3, so a HARQ feedback for the PSSCH may be transmitted in slot n+3. However, if a PSSCH is transmitted in slot n+6 (or slot n+7), the corresponding HARQ feedback is mapped to slot n+9 which is not included in the same COT because the COT ends at slot n+7. Accordingly, the present disclosure provides techniques for cross COT HARQ feedback transmission.

Figure 6:
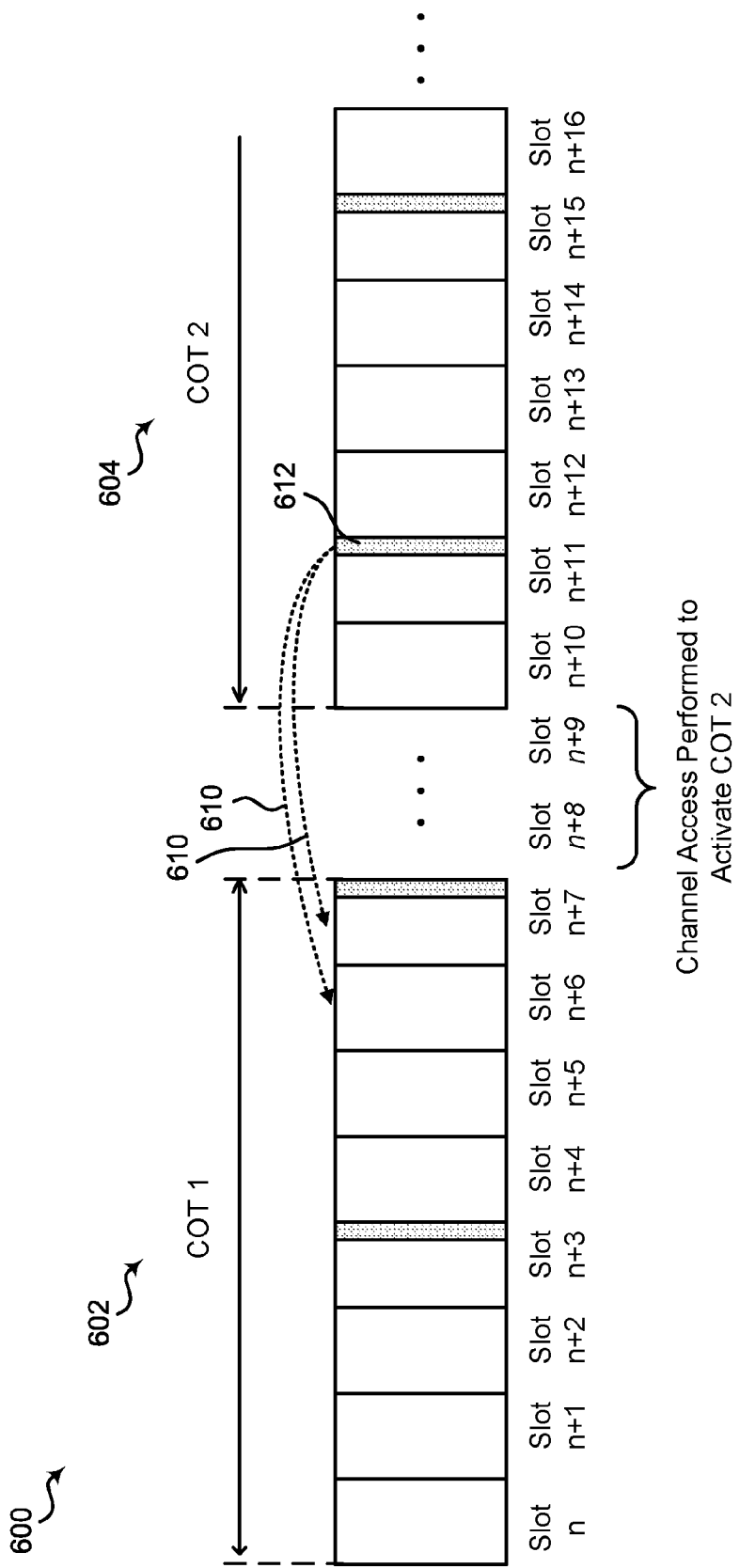
FIG. 6 is a block diagram of a first example feedback technique, according to aspects of the present disclosure.

Referring to FIG. 6, an example of a first feedback technique 600 (e.g., Option 1 described above) is provided. As illustrated, two active COTs, a first active COT 602 and a second active COT 604 may be available. COTs 602 and 604 may be examples of the COT 500.

In the first feedback technique 600, the receiving UE 110 may determine that a first PSFCH occasion 612 (e.g., first available PSFCH to transmit HARQ feedback based on the feedback periodicity N and processing time for the receiving UE 110 to decode a PSSCH transmission) is outside of the first active COT 602. For example, the UE may determine that the feedback should be transmitted in slot n+11, which outside of the first active COT 602 (e.g., current COT). However, based on sidelink decoding (e.g., the UE decoded information of a second active COT 604 from sidelink transmissions in slot n+11), the UE realizes that slot n+11 is included in the second active COT 604, so the UE can still transmit HARQ feedback in slot n+11. In response to this determination, the receiving UE 110 may determine the first PSFCH occasion 612 in a slot of the second active COT 604 is available for sending a HARQ feedback 610. The receiving UE 110 may transmit the HARQ feedback 610, as feedback to the PSSCH transmission received in the slot n+6 or slot n+7 of the first active COT 602, in the first PSFCH occasion 612 (e.g., following a successful Type 2 channel access). In an example, the second active COT 604 may be initiated by either the receiving UE 110 or another UE 110 during channel access. Thus, the receiving UE 110 may transmit the HARQ feedback 610 if the first PSFCH occasion 612 is in the second active COT 604. In an example, the receiving UE 110 may transmit the HARQ feedback 610 if the receiving UE 110 is allowed to transmit (e.g., the receiving UE 110 determines that it can share the second COT 604). The receiving UE 110 may determine that it is allowed to transmit, for example, based on decoded COT information (e.g., from decoding sidelink transmissions in slot n+11), which indicates the COT is a shared COT. In another example, the receiving UE 110 may transmit the HARQ feedback 610 if a channel access (e.g., Type 2 channel access) is successful prior to the HARQ feedback 610 transmission.

As an example, as illustrated by FIG. 6, the first active COT 602 ends at slot n+7 and feedback periodicity N=4. For a data channel transmission in slot n+6 or slot n+7, the PSFCH occasion 612 is determined to be in slot n+11. The receiving UE 110 may determine that slot n+11 is in the second active COT 604 (which is initiated at slot n+10), so the receiving UE 110 may transmit the HARQ feedback 610 in the determined PSFCH occasion 612.

Figure 7:
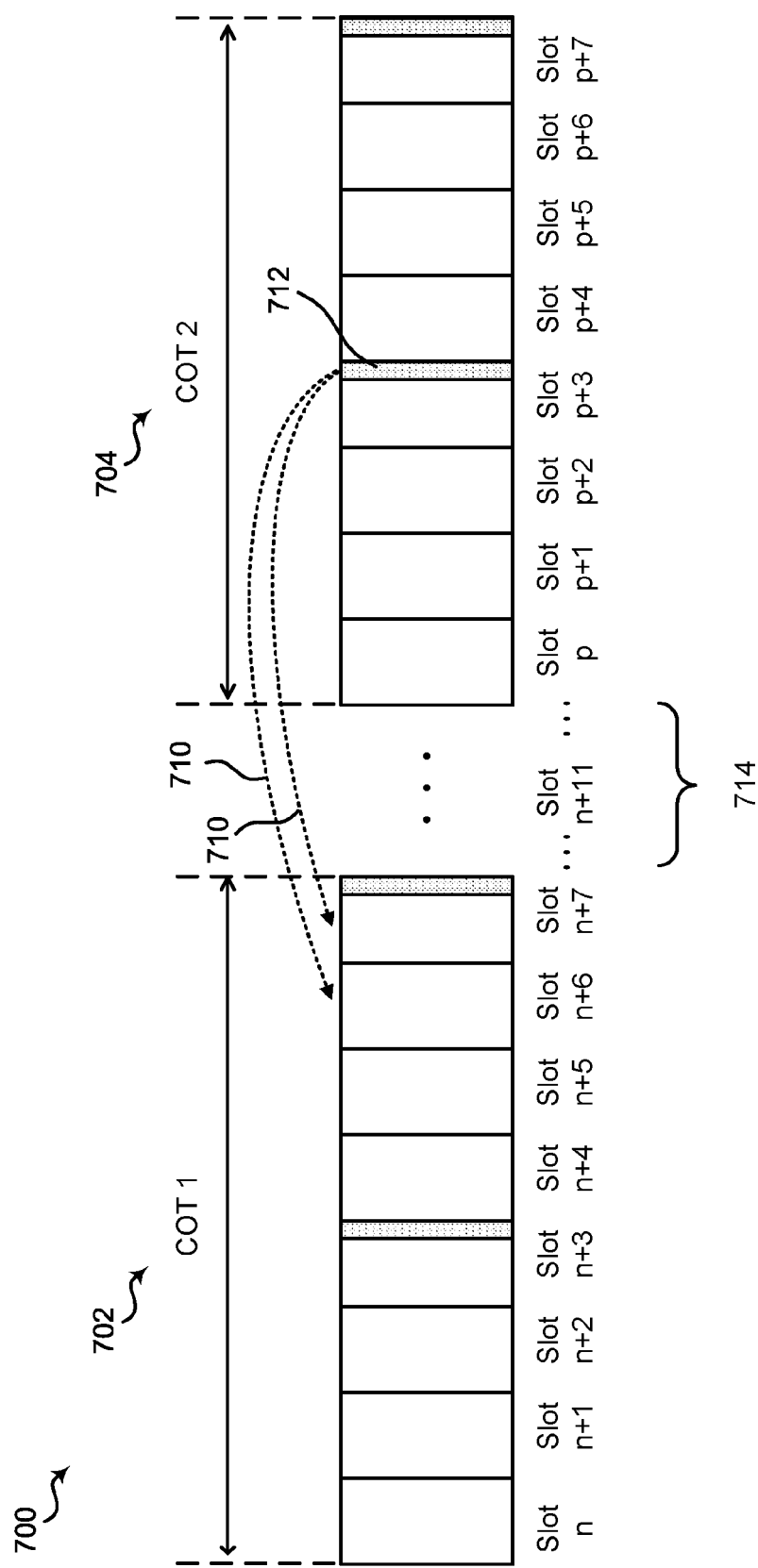
FIG. 7 is a block diagram of a second example feedback technique, according to aspects of the present disclosure.

Referring to FIG. 7, an example of a second feedback technique 700 (e.g., Option 2 described above) is provided. As illustrated, two active COTs, a first active COT 702 and a second active COT 704 (including slot p-slot p+7) may be available. COTs 702 and 704 may be examples of the COT 500.

In the second feedback technique 700, the receiving UE 110 may determine that a PSFCH occasion is out of the first active COT 702 and may transmit a HARQ feedback 710 in the second active COT 704 if the second active COT 704 is adjacent to the first active COT 702. In an example, the second active COT 704 may be initiated by the receiving UE 110, or another UE.

In this technique, "adjacent" may include one or more of the following characteristics: the two COTs 702 and 704 are initiated by the receiving UE 110 (i.e., the same UE); the two COTs 702 and 704 are initiated by two UEs (e.g., receiving UE 110 and a second UE) that are within a range threshold (e.g., distance between COT initiators based on initiator locations as indicated by COT information) of each other; a distance such as absolute distance (e.g., meters) or RF distance (e.g., reference signal receive power (RSRP)) to an initiator UE of the second active COT 704 or initiator UE(s) of both COTs 702 and 704 is within a distance threshold; or a gap 714 (e.g., duration from ending of the first active COT 702 to beginning of the second active COT 704) between the two COTs 702 and 704 has a duration that is smaller than a threshold.

In an example, as illustrated by FIG. 7, the first active COT 702 ends at slot n+7. For a data channel transmission in slot n+6, the PSFCH occasion is determined to be slot n+11, which is not in the first active COT 702. The receiving UE 110 may determine that there is a second active COT 704 that is adjacent to the first active COT 702, based on the characteristics described herein. The receiving UE 702 may determine a second PSFCH occasion 712 in the second active COT 704 to transmit the HARQ feedback 710.

While this example describes the second PSFCH occasion 712 being different than a first PSFCH occasion, in another example, the second PSFCH occasion 712 may be the same as the first PSFCH occasion. In an aspect, the second feedback technique 700 may include a Type 2 channel access for HARQ feedback transmissions.

Figure 8:
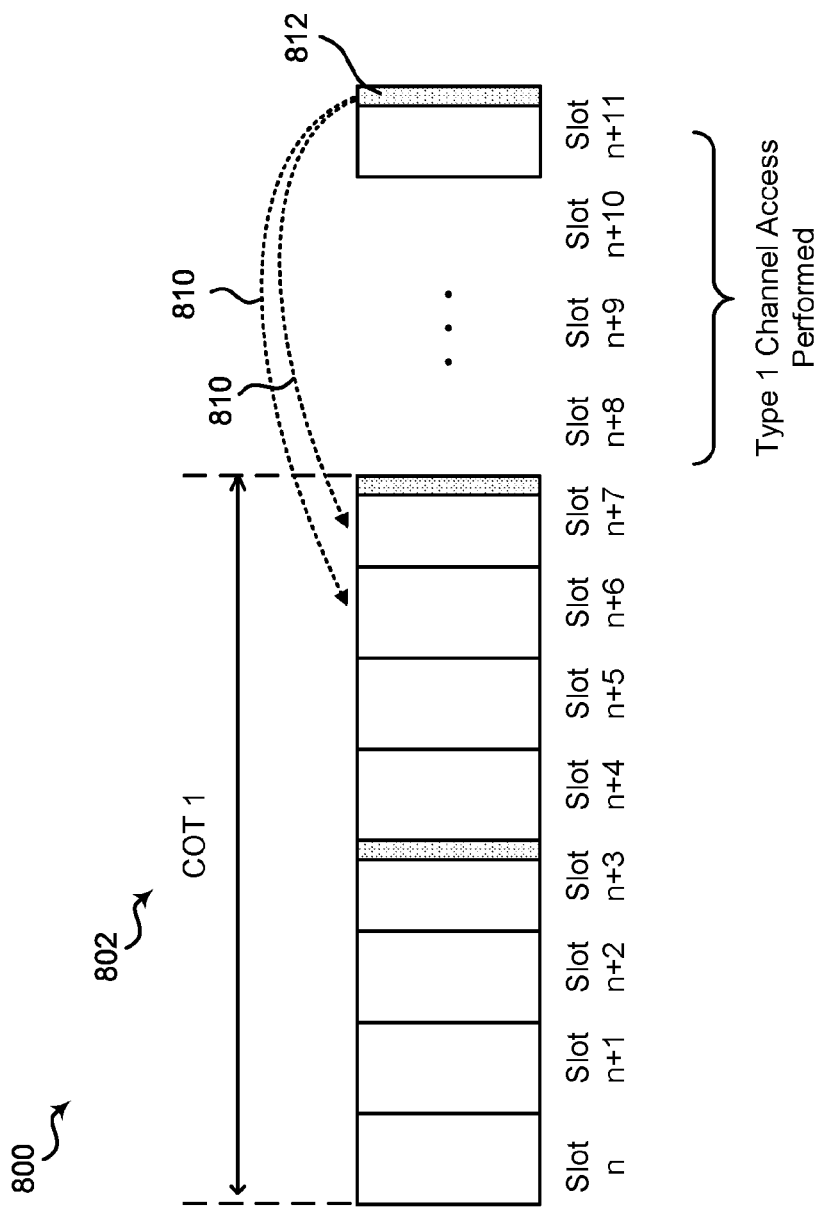
FIG. 8 is a block diagram of a third example feedback technique, according to aspects of the present disclosure.

Referring to FIG. 8, an example of a third feedback technique 800 (e.g., Option 3 described above) is provided. As illustrated, a first active COT 802 may be available. COT 802 may be examples of the COT 500.

In the third feedback technique 800, the receiving UE 800 may perform a Type 1 channel access (e.g., random back-off within a contention window) prior to the first PSFCH occasion 812 (or a HARQ feedback 810), and transmit the HARQ feedback 810 in the first PSFCH occasion 812 if the receiving UE 110 succeeds with the Type 1 channel access (e.g., the Type 1 channel access indicates to the receiving UE 110 an idle channel for transmission). In an example, the UE may perform Type 1 channel access for the HARQ feedback 810 transmission irrespective of the PSFCH occasion 812 being in an active COT or not, and the HARQ feedback may be transmitted if the Type 1 channel access is successful. In another example, the UE may perform Type 1 channel access for HARQ feedback transmission if the PSFCH occasion 812 is not in an active COT; the HARQ feedback 810 may be transmitted if the Type 1 channel access is successful.

As an example, and as illustrated by FIG. 8, the first active COT 802 may end at slot n+7. For a data channel transmission in slot n+6, the PSFCH occasion 812 may be determined to be slot n+11. The receiving UE 110 may determine that slot n+11 is not in the first active COT 802 and therefore perform a Type 1 channel access for the HARQ feedback 810 transmission in slot n+11. The receiving UE 110 may transmit the HARQ feedback 810 in slot n+11 if the Type 1 channel access succeeds.

Figure 9:
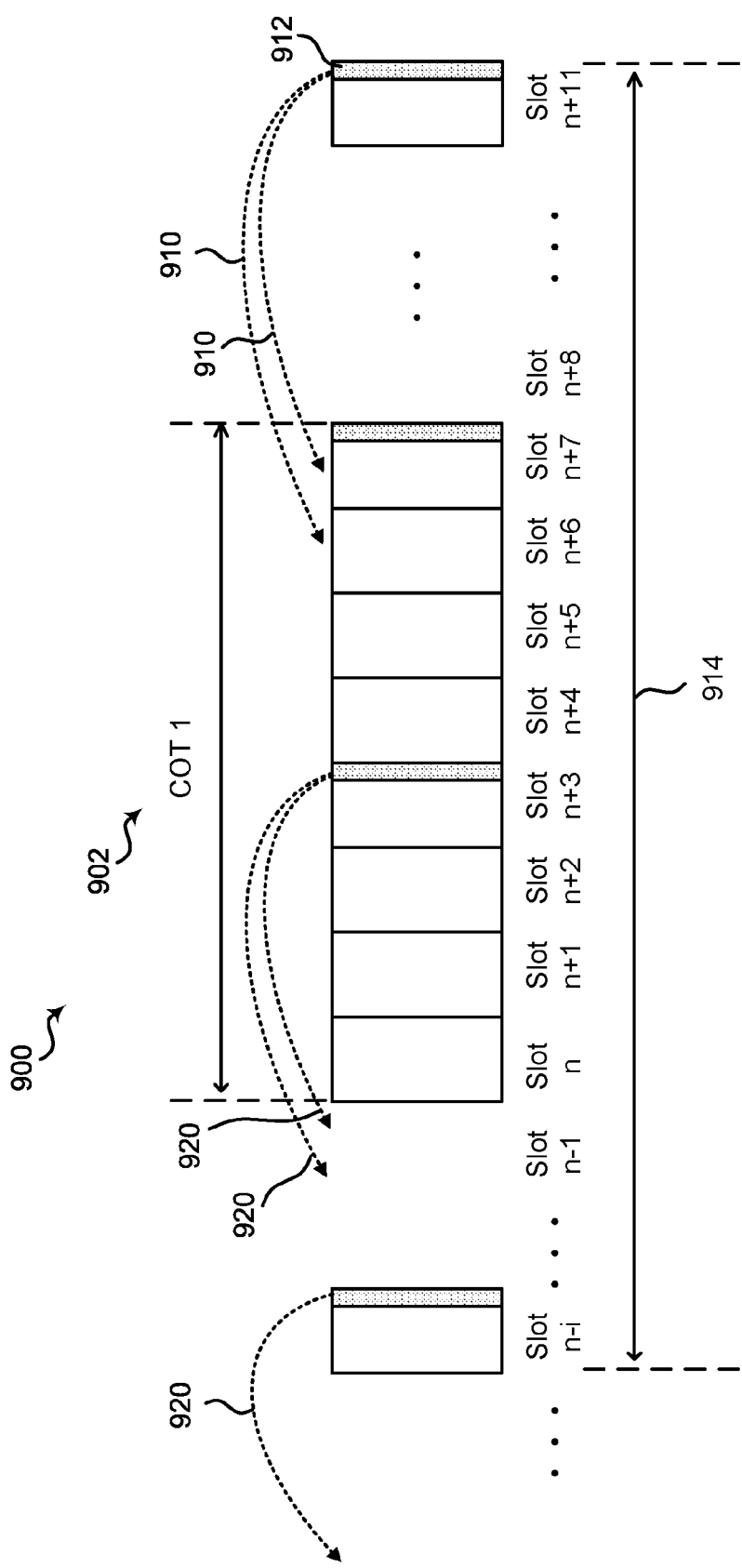
FIG. 9 is a block diagram of a fourth example feedback technique, according to aspects of the present disclosure.

Referring to FIG. 9, an example of a fourth feedback technique 900 (e.g., Option 4 described above) is provided. As illustrated, a first active COT 902 may be available. The COT 902 may be an example of the COT 500.

In the fourth feedback technique 900, the receiving UE 110 may determine that a PSFCH occasion 912 is out of the first active COT 902, and in response to the determination, may determine whether a total number of HARQ feedbacks 910 and 920 within a time window 914 is less than a transmission number threshold, and/or determine a total duration of HARQ feedbacks 910 and 920 in the time window 914 is less than a transmission duration threshold. In this example, the HARQ feedbacks 910 may represent HARQ feedback transmissions that the receiving UE 110 is going to transmit, and the HARQ feedbacks 920 may represent already transmitted HARQ feedback transmissions.

If one or more the thresholds are met, the receiving UE may transmit the HARQ feedback 910 in the first PSFCH occasion 912. In an example, the time window 914 may include a past window of time (e.g., look-back window) set at a determined duration of time (e.g., 50 ms). In an example, the time window 914 may include the first PSFCH occasion 912, as illustrated by FIG. 9. However, in other examples, the first PSFCH occasion 912 may not be included in the time window 914.

In an example, the total number of HARQ feedbacks 910 and 920 may include any transmission that the receiving UE 110 transmits in a PSFCH occasion during the time window 914. In an example, the total duration of the HARQ feedbacks 910 and 920 in the time window 914 may include a duration of each HARQ feedback 910 and 920 during the time window 914.

In an example, the transmission number threshold and the transmission duration threshold may be pre-determined (e.g., configured, pre-configured, or pre-defined by the receiving UE 110). In an example, the transmission number threshold may be 50 for a time window 914 of 50 ms, and the transmission duration threshold may be 2.5 ms for the time window 914 of 50 ms.

In an aspect, the fourth feedback technique 900 may include a PSFCH transmission that is LBT-free. For example, the UE may transmit HARQ feedback based on Type 2-C channel access.

In an aspect, a global PSFCH resource configuration (e.g., PSFCH 308) may be determined based on a periodicity (e.g., feedback periodicity N and a global slot index (e.g., slot index representing physical slot, or slot in a sidelink resource pool). For example, a HARQ timeline may be n+2 and a PSFCH slot period may be N=2 based on slot index in a sidelink resource pool. In another aspect, a COT-specific PSFCH resource configuration may be based on the periodicity (e.g., feedback periodicity N) and a slot index within the COT. For example, a HARQ timeline may be n+2 and a PSFCH slot period may be N=4 within a COT.

In an aspect, different techniques may be applied based on different conditions determined by the receiving UE 110. For example, the third feedback technique 800 may be applied if conditions for the fourth feedback technique 900 are unable to be satisfied. In another example, the third feedback technique 800 may be applied if conditions for the first feedback technique 600 or the second feedback technique 700 are unable to be satisfied. In another example, the second feedback technique 700 may be applied if conditions for the first feedback technique 600 are unable to be satisfied.

Figure 10:
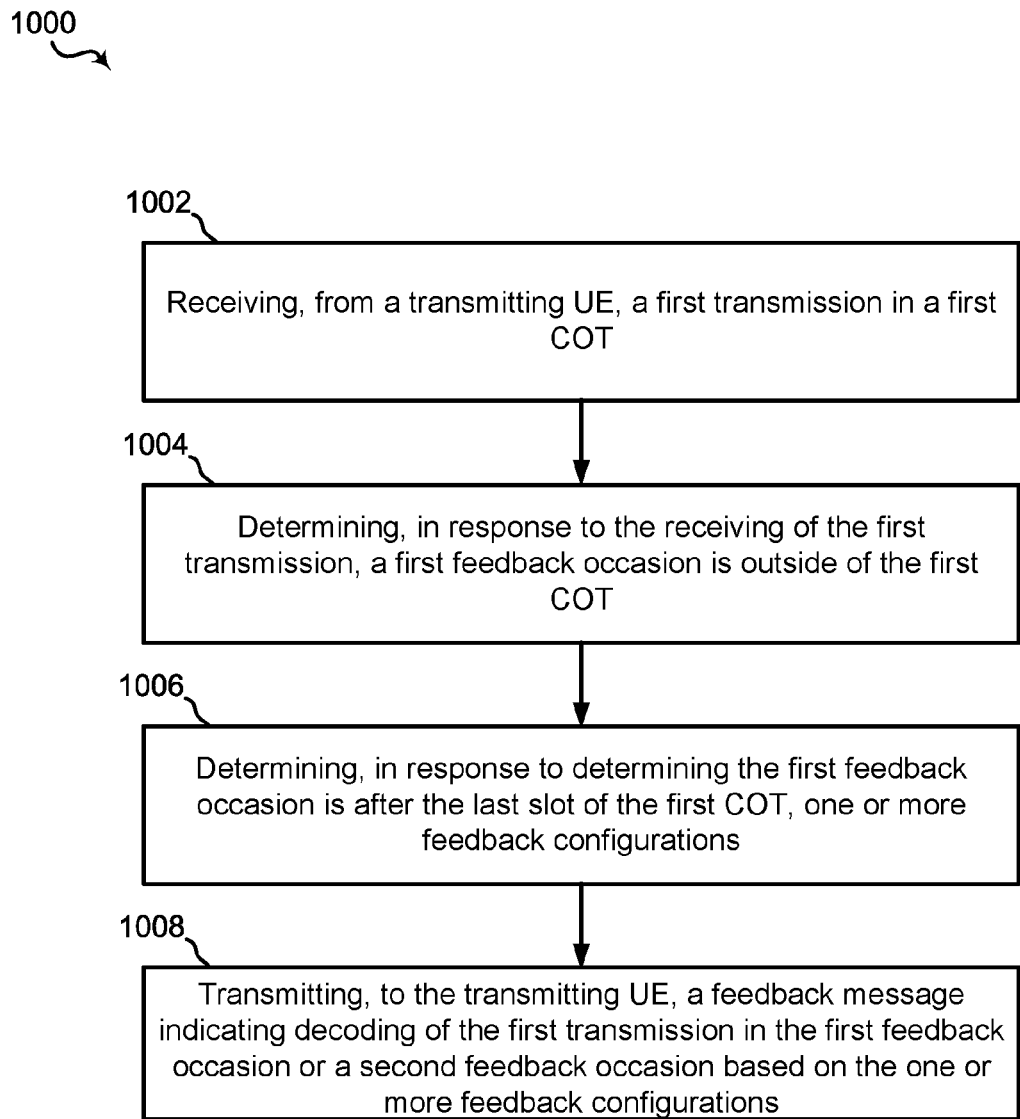
FIG. 10 is flow diagram of an example method performed by a receiving user equipment (UE) of FIG. 1, according to aspects of the present disclosure.

Referring to FIG. 10, an example of a method 1000 for sidelink HARQ feedback transmissions in unlicensed spectrums may be performed by the sidelink HARQ component 142, the modem 140, the transceiver 202, the processor 212, the memory 216, and or any other component/subcomponent of the receiving UE 110 of the wireless communication network 100.

At block 1002, the method 1000 may include receiving, from a transmitting UE, a first transmission in a first COT. For example, the sidelink HARQ component 142, the modem 140, the transceiver 202, the processor 212, and/or the memory 216 of the UE 110, and/or one or more additional components/subcomponents of the UE 110 may be configured to or may comprise means for receiving, from a transmitting UE, a first transmission in a first COT.

For example, the receiving of the first transmission at the block 702 may include receiving by the sidelink HARQ component 142, the modem 140, the transceiver 202, the processor 212, and/or the memory 216 of the UE 110, via the antenna 265, the RF front end 288, and/or the transceiver 202, a data transmission in slot n+6 or slot n+7 of the first COT 602 of FIG. 6, the first COT 702 of FIG. 7, the first COT 802 of FIG. 8, or the first COT 902 of FIG. 9 from a transmitting UE 110.

At block 1004, the method 1000 may include determining, in response to the receiving of the first transmission, a first feedback occasion is outside of the first COT. For example, the sidelink HARQ component 142, the modem 140, the processor 212, and/or the memory 216 of the UE 110, and/or one or more additional components/subcomponents of the UE 110 may be configured to or may comprise means for determining a first feedback occasion is outside of the first COT.

For example, the determining the first feedback occasion is outside of the first COT at block 1004 may include determining by the sidelink HARQ component 142, the modem 140, the processor 212, and/or the memory 216 of the UE 110 the first feedback occasion 612 of FIG. 6 is after the last slot n+7 of the first COT 602, the first feedback occasion (e.g., slot n+11) of FIG. 7 is after the last slot n+7 of the first COT 702, the first feedback occasion 812 of FIG. 8 is after the last slot n+7 of the first COT 802, or the first feedback occasion 912 of FIG. 9 is after the last slot n+7 of the first COT 902.

In an example, the first feedback occasion may be determined based on the feedback periodicity N and a global slot index (e.g., n-n+7), or the feedback periodicity N and a slot index of the second COT (e.g., n+11, or p-p+7).

At block 1006, the method 1000 may include determining, in response to determining the first feedback occasion is after the last slot of the first COT, one or more feedback configurations. For example, the sidelink HARQ component 142, the modem 140, the processor 212, and/or the memory 216 of the UE 110, and/or one or more additional components/subcomponents of the UE 110 may be configured to or may comprise means for determining one or more feedback configurations.

For example, the determining the one or more feedback configurations may include determining by the sidelink HARQ component 142, the modem 140, the processor 212, and/or the memory 216 of the UE 110 the first feedback occasion 612 of FIG. 6 is in an active second COT 604, the a feedback occasion 712 of FIG. 7 is in an adjacent COT 704, a successful Type 1 channel access was performed prior to the first feedback occasion 812 of FIG. 8, or a total number of feedback transmissions 910 and/or 920 (or a total duration of the feedback transmission 910 and/or 920) is less than a threshold (e.g., transmission number threshold or transmission duration threshold).

At block 1008, the method 1000 may include transmitting, to the transmitting UE, a feedback message indicating decoding of the first transmission in the first feedback occasion or a second feedback occasion based on the one or more feedback configurations. For example, the sidelink HARQ component 142, the modem 140, the transceiver 202, the processor 212, and/or the memory 216 of the UE 110, and/or one or more additional components/subcomponents of the UE 110 may be configured to or may comprise means for transmitting, to the transmitting UE, a feedback message indicating decoding of the first transmission in the first feedback occasion or a second feedback occasion based on the one or more feedback configurations.

For example, the transmitting at block 1008 may include transmitting by the sidelink HARQ component 142, the modem 140, the transceiver 202, the processor 212, and/or the memory 216 of the UE 110, via the antenna 265, the RF front end 288, and/or the transceiver 202, to the transmitting UE 110, the HARQ feedback 610 of FIG. 6 indicating decoding of the first transmission in slot n+6 or slot n+7 of the first COT 602 in the first feedback occasion 612 of the second COT 604 based on the one or more feedback configurations (e.g., determining the second COT 704 is an active COT), the HARQ feedback 710 of FIG. 7 indicating decoding of the first transmission in slot n+6 or slot n+7 of the first COT 702 in the feedback occasion 712 (first or second feedback occasion) of the second COT 704 based on the one or more feedback configurations (e.g., determining the second COT 704 is adjacent to the first COT 702), the HARQ feedback 810 of FIG. 8 indicating decoding of the first transmission in slot n+6 or slot n+7 of the first COT 802 in the first feedback occasion 812 based on the one or more feedback configurations (e.g., determining a Type 1 channel access was successful prior to the first feedback occasion 812), or the HARQ feedback 910 of FIG. 9 indicating decoding of the first transmission in slot n+6 or slot n+7 of the first COT 902 in the first feedback occasion 912 based on the one or more feedback configurations (e.g., determining the total number of feedback transmissions is less than a transmission number threshold or determining the total duration of feedback transmissions is less than a transmission duration threshold).

Figure 11:
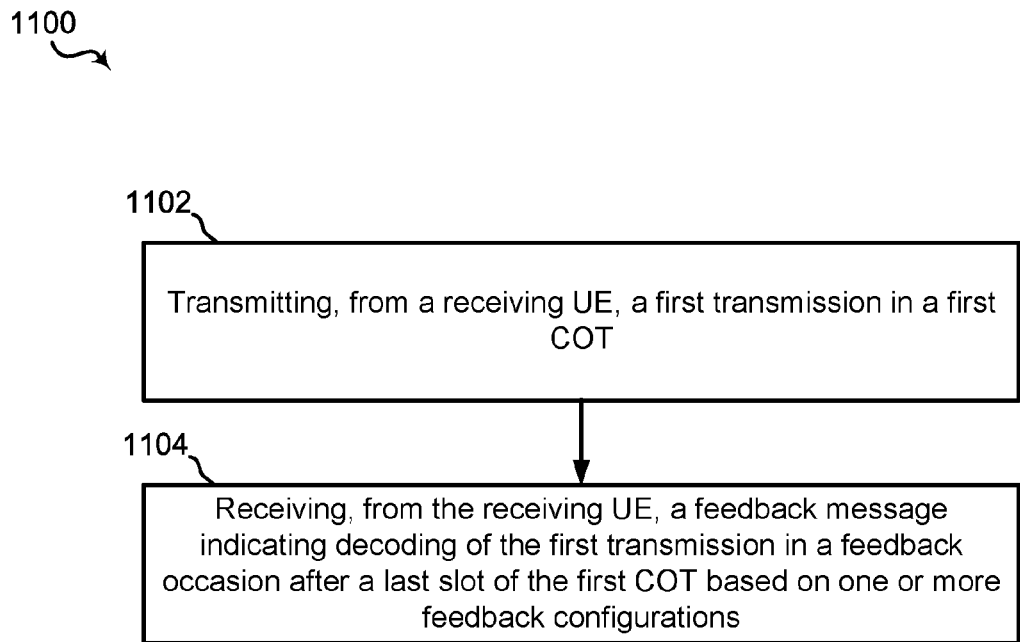
FIG. 11 is a flow diagram of an example method performed by a transmitting UE of FIG. 1, according to aspects of the present disclosure.

Referring to FIG. 11, an example of a method 1100 for sidelink HARQ feedback transmissions in unlicensed spectrums may be performed by the sidelink HARQ component 142, the modem 140, the transceiver 202, the processor 212, the memory 216, and or any other component/subcomponent of the transmitting UE 110 of the wireless communication network 100.

At block 1102, the method 1100 may include transmitting, to a receiving UE, a first transmission in a first COT. For example, the sidelink HARQ component 142, the modem 140, the transceiver 202, the processor 212, and/or the memory 216 of the UE 110, and/or one or more additional components/subcomponents of the UE 110 may be configured to or may comprise means for transmitting, to a receiving UE, a first transmission in a first COT.

For example, the transmitting of the first transmission at the block 1102 may include transmitting, to a receiving UE 110, a data transmission in slot n+6 or slot n+7 of the first COT 602 of FIG. 6, the first COT 702 of FIG. 7, the first COT 802 of FIG. 8, or the first COT 902 of FIG. 9 from a transmitting UE 110.

At block 1104, the method 1100 may include receiving, from the receiving UE, a feedback message indicating decoding of the first transmission in a feedback occasion after a last slot of the first COT based on one or more feedback configurations. For example, the sidelink HARQ component 142, the modem 140, the transceiver 202, the processor 212, and/or the memory 216 of the UE 110, and/or one or more additional components/subcomponents of the UE 110 may be configured to or may comprise means for receiving, from the receiving UE, a feedback message indicating decoding of the first transmission in a feedback occasion after a last slot of the first COT based on one or more feedback configurations.

For example, the receiving at block 1104 may include receiving by the sidelink HARQ component 142, the modem 140, the transceiver 202, the processor 212, and/or the memory 216 of the UE 110, via the antenna 265, the RF front end 288, and/or the transceiver 202, from the receiving UE 110, the HARQ feedback 610 of FIG. 6 indicating decoding of the first transmission in slot n+6 or slot n+7 of the first COT 602 in the first feedback occasion 612 of the second COT 604 based on the one or more feedback configurations (e.g., determining the second COT 704 is an active COT), the HARQ feedback 710 of FIG. 7 indicating decoding of the first transmission in slot n+6 or slot n+7 of the first COT 702 in the feedback occasion 712 (first or second feedback occasion) of the second COT 704 based on the one or more feedback configurations (e.g., determining the second COT 704 is adjacent to the first COT 702), the HARQ feedback 810 of FIG. 8 indicating decoding of the first transmission in slot n+6 or slot n+7 of the first COT 802 in the first feedback occasion 812 based on the one or more feedback configurations (e.g., determining a Type 1 channel access was successful prior to the first feedback occasion 812), or the HARQ feedback 910 of FIG. 9 indicating decoding of the first transmission in slot n+6 or slot n+7 of the first COT 902 in the first feedback occasion 912 based on the one or more feedback configurations (e.g., determining the total number of feedback transmissions is less than a transmission number threshold or determining the total duration of feedback transmissions is less than a transmission duration threshold).

Additional Implementations

An example method of wireless communication by a receiving user equipment (UE), comprising: receiving, from a transmitting UE, a first transmission in a first channel occupancy time (COT); determining, in response to the receiving of the first transmission, a first feedback occasion is outside of the first COT; determining, in response to determining the first feedback occasion is outside of the first COT, one or more feedback configurations; and transmitting, to the transmitting UE, a feedback message indicating decoding of the first transmission in the first feedback occasion or a second feedback occasion based on the one or more feedback configurations.

The above example method, wherein the determining the one or more feedback configurations comprises: determining the first feedback occasion is in a second COT that is active, wherein the feedback message is transmitted in the first feedback occasion of the second COT.

One or more of the above example methods, wherein the second COT is initiated by the receiving UE or a second UE.

One or more of the above example methods, further comprising: determining the feedback message can be transmitted in the second COT based on the second COT being shared with one or more second UEs, wherein the feedback message is transmitted further based on the second COT being shared.

One or more of the above example methods, further comprising: performing a channel access, wherein the feedback message is transmitted further based on the channel access being successful.

One or more of the above example methods, wherein the determining the one or more feedback configurations comprises: determining a second COT is active and adjacent to the first COT, wherein the feedback message is transmitted in the first feedback occasion of the second COT.

One or more of the above example methods, wherein the second COT is adjacent to the first COT based on the first COT and the second COT being initiated by a same UE including the receiving UE or a second UE.

One or more of the above example methods, wherein the second COT is adjacent to the first COT based on the first COT and the second COT being initiated by two UEs that are within a range threshold of each other, the two UEs including the receiving UE or one or more second UEs.

One or more of the above example methods, wherein the second COT is adjacent to the first COT based on an absolute distance or a radio frequency (RF) distance from the receiving UE to an initiator UE or the absolute distance or the RF distance between initiator UEs of both the first COT and the second COT is within a distance threshold, the initiator UEs including the receiving UE or one or more second UEs.

One or more of the above example methods, wherein the second COT is adjacent to the first COT based on a gap between the last slot of the first COT and a first slot of the second COT has a duration less than a gap threshold.

One or more of the above example methods, wherein the determining the one or more feedback configurations comprises: performing a channel access prior to the transmitting the feedback message, wherein the feedback message is transmitted in the first feedback occasion further based on the channel access being successful, and wherein the channel access includes channel sensing or energy detection performed in a random number of sensing slots.

One or more of the above example methods, wherein the first feedback occasion is in a non-active COT.

One or more of the above example methods, wherein the determining the one or more feedback configurations comprises: determining one or both of a total number of feedback messages transmitted during a time window is less than a transmission number threshold or a total duration of the feedback messages during the time window is less than a transmission duration threshold.

One or more of the above example methods, wherein the first feedback occasion is determined based on a feedback periodicity and a global slot index or wherein the first feedback occasion is determined based on a feedback periodicity and a slot index within a second COT.

An example apparatus, comprising: a memory comprising instructions; and one or more processors communicatively coupled with the memory and configured to execute the instructions to perform one or more of the above example methods.

An example computer readable medium (e.g., a non-transitory computer readable medium) having instructions stored therein that, when executed by one or more processors, cause the one or more processors to perform one or more of the above example methods.

An example apparatus, comprising: means for performing one or more of the above example methods.

A second example method of wireless communication by a transmitting UE, comprising: transmitting, to a receiving UE, a first transmission in a first COT; and receiving, from the receiving UE, a feedback message indicating decoding of the first transmission in a feedback occasion after a last slot of the first COT based on one or more feedback configurations.

An example apparatus, comprising: a memory comprising instructions; and one or more processors communicatively coupled with the memory and configured to execute the instructions to perform one or more of the above second example methods.

An example computer readable medium (e.g., a non-transitory computer readable medium) having instructions stored therein that, when executed by one or more processors, cause the one or more processors to perform one or more of the above second example methods.

An example apparatus, comprising: means for performing one or more of the above second example methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 NEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a receiving user equipment (UE), comprising:
   receiving, from a transmitting UE, a first transmission in a first channel occupancy time (COT);
   determining, in response to the receiving of the first transmission, a first feedback occasion is outside of the first COT, wherein the first feedback occasion is determined based on a feedback periodicity and a global slot index or wherein the first feedback occasion is determined based on a feedback periodicity and a slot index within a second COT;
   determining, in response to determining the first feedback occasion is outside of the first COT, one or more feedback configurations; and
   transmitting, to the transmitting UE, a feedback message indicating decoding of the first transmission in the first feedback occasion or a second feedback occasion based on the one or more feedback configurations.

2. The method of claim 1, wherein the determining the one or more feedback configurations comprises:
   determining the first feedback occasion is in a second COT that is active, wherein the feedback message is transmitted in the first feedback occasion of the second COT.

3. The method of claim 2, wherein the second COT is initiated by the receiving UE or a second UE.

4. The method of claim 2, further comprising:
   determining the feedback message can be transmitted in the second COT based on the second COT being shared with one or more second UEs, wherein the feedback message is transmitted further based on the second COT being shared.

5. The method of claim 2, further comprising:
   performing a channel access, wherein the feedback message is transmitted further based on the channel access being successful.

6. The method of claim 1, wherein the determining the one or more feedback configurations comprises:
   determining a second COT is active and adjacent to the first COT, wherein the feedback message is transmitted in the first feedback occasion or the second feedback occasion that is in the second COT.

7. The method of claim 6, wherein the second COT is adjacent to the first COT based on the first COT and the second COT being initiated by a same UE including the receiving UE or a second UE.

8. The method of claim 6, wherein the second COT is adjacent to the first COT based on the first COT and the second COT being initiated by two UEs that are within a range threshold of each other, the two UEs including the receiving UE or one or more second UEs.

9. The method of claim 6, wherein the second COT is adjacent to the first COT based on an absolute distance or a radio frequency (RF) distance from the receiving UE to an initiator UE or the absolute distance or the RF distance between initiator UEs of both the first COT and the second COT is within a distance threshold, the initiator UEs including the receiving UE or one or more second UEs.

10. The method of claim 6, wherein the second COT is adjacent to the first COT based on a gap between the last slot of the first COT and a first slot of the second COT has a duration less than a gap threshold.

11. The method of claim 1, wherein the determining the one or more feedback configurations comprises:
    performing a channel access prior to the transmitting the feedback message, wherein the feedback message is transmitted in the first feedback occasion further based on the channel access being successful, and wherein the channel access includes channel sensing or energy detection performed in a random number of sensing slots.

12. The method of claim 11, wherein the first feedback occasion is in a non-active COT.

13. The method of claim 1, wherein the determining the one or more feedback configurations comprises:
    determining one or both of a total number of feedback messages transmitted during a time window is less than a transmission number threshold or a total duration of the feedback messages during the time window is less than a transmission duration threshold.

14. A method of wireless communication by a transmitting user equipment (UE), comprising:
    transmitting, to a receiving UE, a first transmission in a first channel occupancy time (COT); and
    receiving, from the receiving UE, a feedback message indicating decoding of the first transmission in a feedback occasion out of the first COT based on one or more feedback configurations, wherein the feedback occasion is determined based on a feedback periodicity and a global slot index or wherein the feedback occasion is determined based on a feedback periodicity and a slot index within a second COT.

15. A receiving user equipment (UE), comprising:
a memory comprising instructions; and
one or more processors communicatively coupled with the memory and configured to execute the instructions to cause the UE to:
  receive, from a transmitting UE, a first transmission in a first channel occupancy time (COT);
  determine, in response to the receiving of the first transmission, a first feedback occasion is outside of the first COT, wherein the first feedback occasion is determined based on a feedback periodicity and a global slot index or wherein the first feedback occasion is determined based on a feedback periodicity and a slot index within a second COT;
  determine, in response to determining the first feedback occasion is outside of the first COT, one or more feedback configurations; and
  transmit, to the transmitting UE, a feedback message indicating decoding of the first transmission in the first feedback occasion or a second feedback occasion based on the one or more feedback configurations.

16. The receiving UE of claim 15, wherein the determine the one or more feedback configurations comprises:
  determining the first feedback occasion is in a second COT that is active, wherein the feedback message is transmitted in the first feedback occasion of the second COT.

17. The receiving UE of claim 16, wherein the second COT is initiated by the receiving UE or a second UE.

18. The receiving UE of claim 16, wherein the one or more processors are further configured to execute the instructions to:
  determine the feedback message can be transmitted in the second COT based on the second COT being shared with one or more second UEs, wherein the feedback message is transmitted further based on the second COT being shared.

19. The receiving UE of claim 16, wherein the one or more processors are further configured to execute the instructions to:
  perform a channel access, wherein the feedback message is transmitted further based on the channel access being successful.

20. The receiving UE of claim 15, wherein the determine the one or more feedback configurations comprises:
  determining a second COT is active and adjacent to the first COT, wherein the feedback message is transmitted in the first feedback occasion or the second feedback occasion that is in the second COT.

21. The receiving UE of claim 20, wherein the second COT is adjacent to the first COT based on the first COT and the second COT being initiated by a same UE including the receiving UE or a second UE.

22. The receiving UE of claim 20, wherein the second COT is adjacent to the first COT based on the first COT and the second COT being initiated by two UEs that are within a range threshold of each other, the two UEs including the receiving UE or one or more second UEs.

23. The receiving UE of claim 20, wherein the second COT is adjacent to the first COT based on an absolute distance or a radio frequency (RF) distance from the receiving UE to an initiator UE or the absolute distance or the RF distance between initiator UEs of both the first COT and the second COT is within a distance threshold, the initiator UEs including the receiving UE or one or more second UEs.

24. The receiving UE of claim 20, wherein the second COT is adjacent to the first COT based on a gap between the last slot of the first COT and a first slot of the second COT has a duration less than a gap threshold.

25. The receiving UE of claim 15, wherein the determine the one or more feedback configurations comprises:
  performing a channel access prior to the transmitting the feedback message, wherein the feedback message is transmitted in the first feedback occasion further based on the channel access being successful, and wherein the channel access includes channel sensing or energy detection performed in a random number of sensing slots.

26. The receiving UE of claim 25, wherein the first feedback occasion is in a non-active COT.

27. The receiving UE of claim 15, wherein the determine the one or more feedback configurations comprises:
  determining one or both of a total number of feedback messages transmitted during a time window is less than a transmission number threshold or a total duration of the feedback messages during the time window is less than a transmission duration threshold.

28. A transmitting user equipment (UE), comprising:
a memory comprising instructions; and
one or more processors communicatively coupled with the memory and configured to execute the instructions to cause the UE to:
  transmit, to a receiving UE, a first transmission in a first channel occupancy time (COT); and
  receive, from the receiving UE, a feedback message indicating decoding of the first transmission in a feedback occasion out of the first COT based on one or more feedback configurations, wherein the feedback occasion is determined based on a feedback periodicity and a global slot index or wherein the feedback occasion is determined based on a feedback periodicity and a slot index within a second COT.

* * * * *